(12) United States Patent
Hirai et al.

(10) Patent No.: US 8,887,425 B2
(45) Date of Patent: Nov. 18, 2014

(54) DISPLAY DEVICE AND METHOD FOR MANUFACTURING THE SAME

(75) Inventors: Akira Hirai, Yongin (KR); Dong-Ho Lee, Yongin (KR); Seon-Chool Kim, Yongin (KR); Sang-Wook Lee, Yongin (KR); Sung-Ki Jung, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 144 days.

(21) Appl. No.: 13/315,262

(22) Filed: Dec. 8, 2011

(65) Prior Publication Data

US 2012/0204459 A1  Aug. 16, 2012

(30) Foreign Application Priority Data

Feb. 10, 2011 (KR) .................. 10-2011-0011939

(51) Int. Cl.
*H05K 5/00* (2006.01)
*G09F 9/30* (2006.01)
*G02F 1/1333* (2006.01)

(52) U.S. Cl.
CPC ...... *G09F 9/30* (2013.01); *G02F 2001/133331* (2013.01); *G02F 2201/50* (2013.01); *G02F 1/133308* (2013.01)
USPC ............... 40/700; 345/173; 345/174; 349/58; 361/679.01

(58) Field of Classification Search
USPC ............ 345/173, 174; 349/58; 361/679.01
See application file for complete search history.

(56) References Cited

U.S. PATENT DOCUMENTS

| 2010/0284132 A1* | 11/2010 | Yi et al. ............... 361/679.01 |
| 2011/0122090 A1* | 5/2011 | Suetomi et al. ........... 345/174 |
| 2011/0151937 A1* | 6/2011 | Kusuda et al. ............ 455/566 |

FOREIGN PATENT DOCUMENTS

| JP | 2001-277288 | 10/2001 | |
| KR | 10-2008-0109684 A | 12/2008 | |
| KR | 10-2010-0039495 A | 4/2010 | |
| KR | 10-2010-0044228 A | 4/2010 | |
| WO | WO 2009145154 A1 * | 12/2009 | ............ 345/174 |

* cited by examiner

*Primary Examiner* — Syed A Islam
(74) *Attorney, Agent, or Firm* — Christie, Parker & Hale, LLP

(57) ABSTRACT

A display device has a cover window that is light, has good resistance against external impact, and is capable of being processed with various shapes. A display device according to the present invention includes: a display panel including a display area and a non-display area; and a cover window positioned at the front side of the display panel and including a transparent area corresponding to the display area and a non-transparent area corresponding to the non-display area, wherein the cover window includes a cover window main body formed with the transparent area and the non-transparent area, and a transparent protection layer formed at the front surface of the cover window main body. The transparent protection layer extends to the rear surface corresponding to at least a portion of the non-transparent area of the cover window main body.

16 Claims, 7 Drawing Sheets

DISPLAY DEVICE AND METHOD FOR MANUFACTURING THE SAME

CROSS-REFERENCE TO RELATED APPLICATION

This application claims priority to and the benefit of Korean Patent Application No. 10-2011-0011939 filed in the Korean Intellectual Property Office on Feb. 10, 2011, the entire contents of which are incorporated herein by reference.

BACKGROUND

1. Technical Field

The described technology relates generally to a display device. More particularly, the described technology relates to a display device having a transparent cover window, and a manufacturing method thereof.

2. Description of Related Art

Recently, portable telephones, navigation devices, digital cameras, electronic books, portable game consoles, and various other terminals and mobile electronic devices having liquid crystal displays (LCDs) or organic light emitting diodes (OLED) have been used as display devices.

In a general display device used by these mobile devices, a transparent cover window is provided at a front side of the display panel for a user to view a display unit. The transparent cover window is a component that is formed at the outermost part of the device, so it must have excellent impact resistance against external impact to protect the display panel inside the device.

Furthermore, instead of a conventional method in which a switch or a keyboard is used as an input device, structures using a touch panel formed with a display screen in one body have been widely used. Accordingly, the prevalence of surfaces of transparent cover windows being contacted with a finger, etc., has increased compared with conventional mobile devices, thereby requiring significant strength.

The above information disclosed in this Background section is provided solely to enhance the understanding of the background of the described technology. Therefore, it may contain information that is not prior art or that is not already known in this country to a person of ordinary skill in the art.

SUMMARY

According to embodiments of the present invention, a display device includes a cover window having a protection layer that is light and simultaneously has good impact resistance, is easily designed, and has a uniform thickness. According to other embodiments, a manufacturing method of the cover window is provided.

A display device according to an exemplary embodiment includes a display panel including a display area and a non-display area, and a cover window positioned at the front side of the display panel and including a transparent area corresponding to the display area and a non-transparent area corresponding to the non-display area. The cover window includes a cover window main body formed with the transparent area and the non-transparent area, and a transparent protection layer formed at the front surface of the cover window main body. The transparent protection layer extends to the rear surface corresponding to at least a portion of the non-transparent area of the cover window main body.

The transparent protection layer may be made of an ultraviolet (UV) and/or thermal hardening resin.

The transparent protection layer may further include transparent particles.

The transparent particles may have a refractive index substantially equivalent to the ultraviolet (UV) and/or thermal hardening resin.

A touch panel may be further included between the display panel and the cover window.

The cover window main body may further include a masking layer corresponding to the non-transparent area between the cover window main body and the transparent protection layer.

The cover window main body may include a hole, and the non-transparent area is formed near the hole.

The transparent area of the cover window main body may be made of the same material as the transparent protection layer.

A manufacturing method of a display device according to an exemplary embodiment includes: providing a display panel including a display area and a non-display area; providing a cover window main body having a non-transparent area corresponding to the non-display area; disposing the cover window main body inside a mold; injecting a protection layer formation resin between the mold and the cover window main body to form a transparent protection layer; receiving surplus protection layer formation resin that remains after the formation of the transparent protection layer into the rear surface of the cover window main body corresponding to the non-transparent area; and hardening the protection layer formation resin by ultraviolet (UV) radiation and/or heat.

According to exemplary embodiments, a cover window for a display device with a light weight and simultaneously strong impact resistance against an external impact may be obtained.

Also, according to exemplary embodiments, a transparent protection layer may be formed with a uniform thickness at the surface of the cover window for the display device without deteriorating strength.

Also, according to exemplary embodiments, the cover window for the display device may be formed with various shapes.

DETAILED DESCRIPTION OF THE EMBODIMENTS

Figure 1:
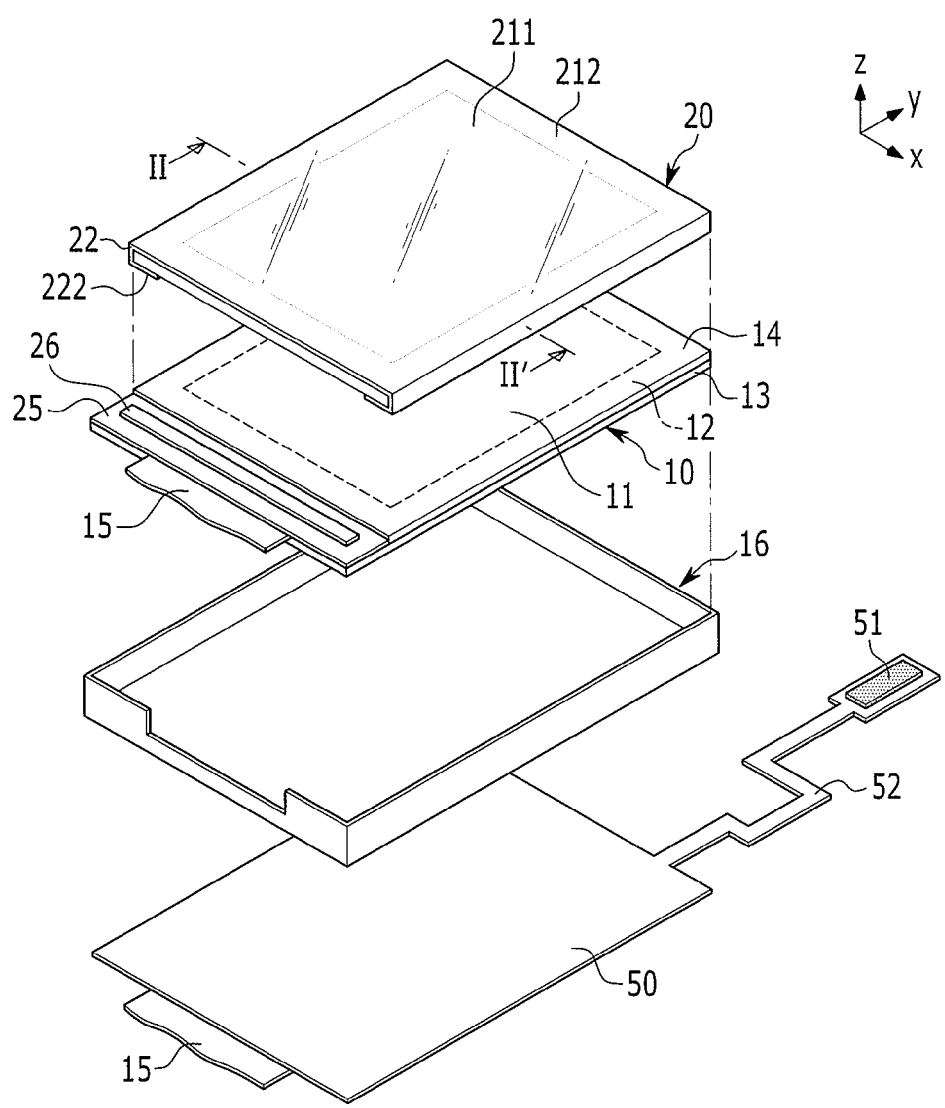
FIG. 1 is an exploded perspective view of a display device according a first exemplary embodiment.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Furthermore, as the size and thickness of the respective structural components shown in the drawings are arbitrarily illustrated for explanatory convenience, the present invention is not limited to the illustrations.

In the drawings, the thickness of layers, films, panels, regions, etc., are exaggerated for clarity. Like reference numerals designate like elements throughout the specification. It will be understood that when an element such as a layer, film, region, or panel is referred to as being "on" another element, it can be directly on the other element or intervening elements may also be present. In contrast, when an element is referred to as being "directly on" another element, there are no intervening elements present. Meanwhile, throughout the specification, "a front surface" and "a rear surface" of a display device respectively mean a top surface of a z-axis direction and a bottom surface of the z-axis direction in drawings.

In addition, parts not related to the description are omitted for clarity of description of the present invention, and like reference numerals designate like elements and similar constituent elements throughout the specification.

Further, constituent elements having the same configurations in the exemplary embodiments are exemplarily described in a first exemplary embodiment using like reference numerals, and only configurations different from those in the first exemplary embodiment will be described in the other exemplary embodiments.

FIG. 1 is an exploded perspective view of a display device according to the first exemplary embodiment.

Referring to FIG. 1, a display device 100 according to the present exemplary embodiment includes a display panel 10 for displaying images, a housing 16 receiving the display panel 10 and various elements, and a cover window 20 disposed at a front side of the display panel 10 and protecting the display panel 10.

The display panel 10 may be an organic light emitting display panel. On the other hand, the display panel 10 may be another display panel, for example a liquid crystal display panel, instead of the organic light emitting display panel. For better understanding and ease of description, in the present exemplary embodiment, the organic light emitting display panel will be described as an example, however the present invention is not limited thereto.

The display panel 10 is electrically connected to a printed circuit board (PCB) 50 through a flexible printed circuit (FPC) 15.

A plurality of pixels as a base unit for image expression are arranged in a matrix format on a first substrate 13 of the display panel 10, and a second substrate 14 is adhered to the first substrate 13 through a sealing member (not shown) to protect the pixels. The first substrate 13 may be a rear substrate and the second substrate 14 may be a front substrate.

As an example, each pixel in the active matrix organic light emitting display panel includes an organic light emitting element (not shown) having an anode, an organic emission layer, and a cathode; and a driving circuit (not shown) driving the organic light emitting element. The driving circuit may be a thin film transistor. A source terminal of the thin film transistor is connected to a data line and a gate terminal is connected to a gate line. Also, a drain terminal is connected to one of the anode and the cathode of the organic light emitting element.

The data line and the gate line of the thin film transistor are connected to the printed circuit board (PCB) 50 through the flexible printed circuit (FPC) 15.

If an electric signal is input to the source terminal and the gate terminal of the thin film transistor through the printed circuit board (PCB) 50, the thin film transistor is turned on or off according to the input signal such that the electrical signal for the driving of the pixel is output to the drain terminal.

An integrated circuit chip 26 for controlling the display panel 10 is mounted on the first substrate 13. The integrated circuit chip 26 generates timing signals to apply data driving signals and gate driving signals with appropriate timing. Also, these signals are applied to the data line and the gate line of the display panel 10. A protective layer 25 is formed near the integrated circuit chip 26 to protect the integrated circuit chip 26.

The printed circuit board (PCB) 50 is mounted with electronic elements (not shown) to process the driving signals. The printed circuit board (PCB) 50 includes a connector 51 and an extension 52, and the extension 52 is installed at one end of the connector 51 to transmit external signals to the printed circuit board (PCB) 50.

The cover window 20 protecting the display panel 10 is positioned at the front side of the display panel 10. The cover window 20 may be made of a synthetic resin material, thereby protecting the display panel 10 against breakage caused by external impact. Also, the display panel 10 and the cover window 20 may be attached by a predetermined adhesive layer (not shown). Further, as another exemplary embodiment, the display panel 10 and the cover window 20 may be separated from each other via an air layer interposed therebetween.

The cover window 20 includes a cover window main body 21 having a transparent area 211 corresponding to a display area 11 of the display panel 10 and that is transparent such that the display area 11 can be viewed from the outside. The cover window main body 12 also has a non-transparent area 212 corresponding to a non-display area 12 of the display panel 10 and that is non-transparent such that the non-display area 12 cannot be seen. The non-transparent area 212 functions to keep the wires or elements formed at the non-display area 12 of the display panel 10 from being seen from the outside. The non-transparent area 212 may include a logo of the product or a decorative shape. Also, a transparent protection layer 22 may be formed to cover the entire front surface of the cover window main body 21 and a portion of the non-transparent area 212 of the side surface and the rear surface.

Next, the cover window 20 will be described with reference to FIG. 2 through FIG. 4.

Figure 2:
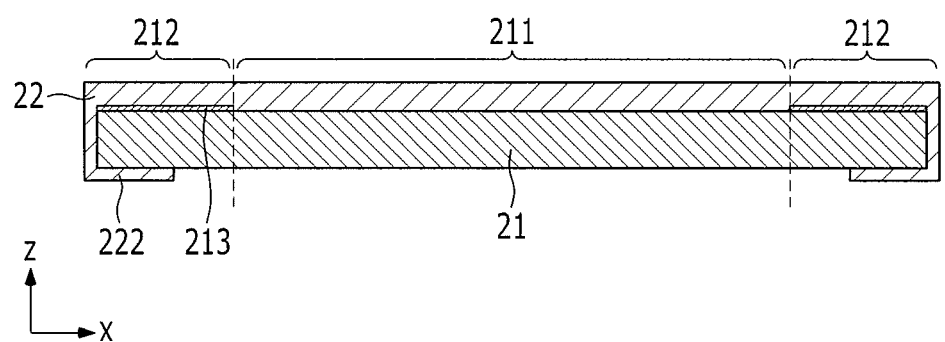
FIG. 2 is a cross-sectional view of the cover window shown in FIG. 1 taken along the line II-II'.
Figure 3:
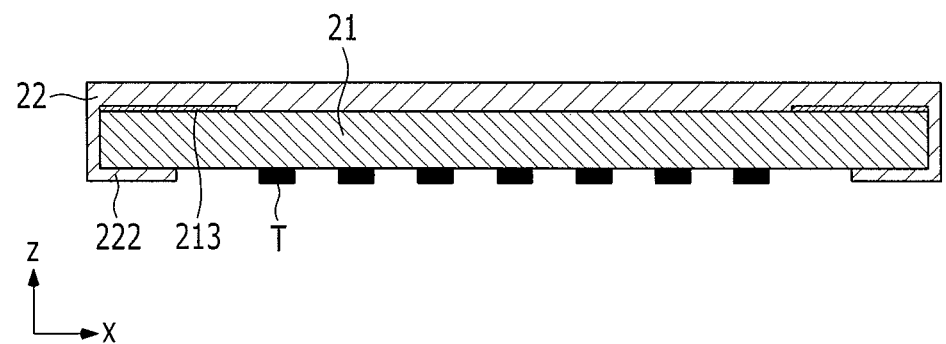
FIG. 3 is a cross-sectional view of a variation of the first exemplary embodiment.

FIG. 2 is a cross-sectional view of the cover window of FIG. 1 taken along the line II-II' of FIG. 1.

As shown in FIG. 2, the cover window 20 is formed such that the cover window main body 21 (including the transparent area 211 and the non-transparent area 212) is covered with the transparent protection layer 22.

The cover window main body 21 may be a synthetic resin, glass, or a ceramic material. As shown in FIG. 2, the non-transparent area 212 may be obtained by forming a masking layer 213 through printing or decoration molding at the relevant portions of the transparent cover window main body 21 (i.e., except for the transparent area 211). As shown in FIG. 2, the masking layer 213 may be formed at the front surface of the cover window main body 21 or the rear surface of the cover window main body 21.

The transparent protection layer 22 covers the cover window main body 21 formed with the non-transparent area 212 by the masking layer 213. The transparent protection layer 22 is made of an ultraviolet (UV) and/or thermal hardening transparent resin that is hardened by ultraviolet (UV) radiation or heat (hereinafter, the resin for forming the transparent protection layer 22 is referred to as "a protection layer formation resin"). The ultraviolet (UV) radiation and/or thermal hardening transparent resin may be polymethylmethacrylate (PMMA) or polysilsesquioxane (PSSQ). The transparent protection layer 22 extends from the front surface and is formed at the portion of the non-transparent area 212 of the side surface and the rear surface as well as the front surface of the cover window main body 21. Particularly, an extension 222 is formed on the region corresponding to the non-transparent area 212 of the rear surface. The extension 222 is a portion that is capable of receiving surplus resin when forming the transparent protection layer 22 on the cover window main body 21, and the thickness of the transparent protection layer 22 may be small and uniform through the extension 222. The width of the extension 222 changes according to the amount of surplus resin in the manufacturing process, however it is preferably not larger than the width of the non-transparent area 212. That is, the extension 222 must be less than the width of the non-transparent area 212 such that the extension 222 covered by the non-transparent area 212 is not recognized, and thereby, display performance of the display device is not influenced. A detailed manufacturing method will be described later.

On the other hand, the cover window itself of the present exemplary embodiment includes a touch panel or may function as a touch panel. That is, as shown in FIG. 3, at the rear surface of the main body of the cover window 20' according to a variation of the present exemplary embodiment, a touch panel T is provided, thereby having a touch window that is capable of sensing signals by touch. In this configuration, the portion that is touched by the user is protected by the transparent protection layer 22 such that the cover window 20' which is light and has good resistance against impact by touch may be obtained.

Figure 4A:
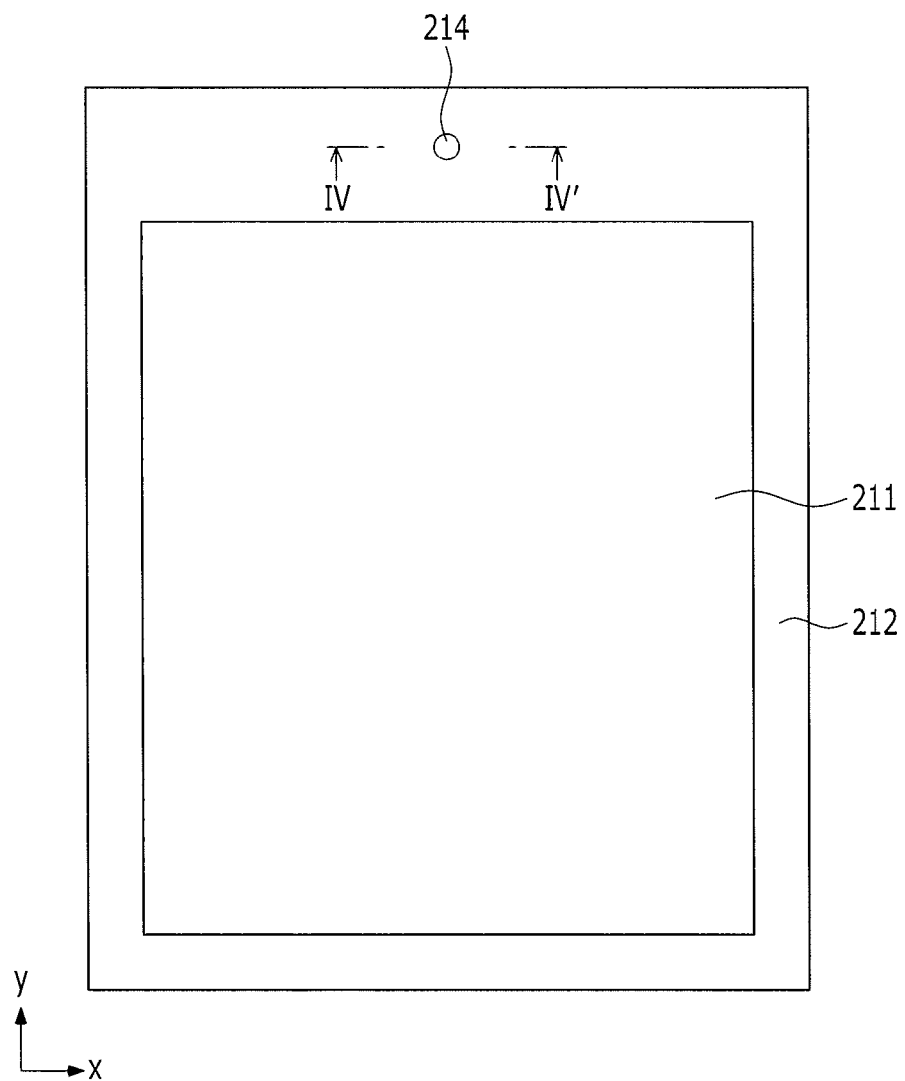
FIG. 4A is a top plan view of a cover window according to another variation of the first exemplary embodiment.
Figure 4B:
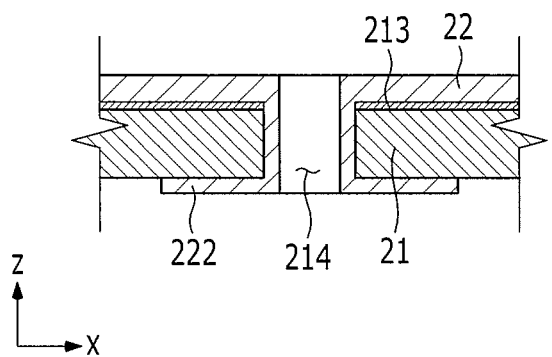
FIG. 4B is a cross-sectional view taken along the line IV-IV' of FIG. 4A.

FIG. 4A is a top plan view of a cover window according to another variation of the first exemplary embodiment, and FIG. 4B is a cross-sectional view taken along the line II-II' of FIG. 4A.

Referring to FIG. 4A and FIG. 4B, the non-transparent area 212 of the cover window 20 further includes a hole 214 for use as a speaker or microphone. The masking layer 213 for covering the inner elements is formed at the non-transparent area 212 near the hole 214. Here, the transparent protection layer 22 may have the extension 222 that extends to an interior wall of the hole 214 and is formed at the portion of the non-transparent area 212 of the rear surface of the cover window main body 21. The surplus resin that is generated when forming the transparent protection layer 22 may be received by the extension 222 near the hole 214.

Figure 5:
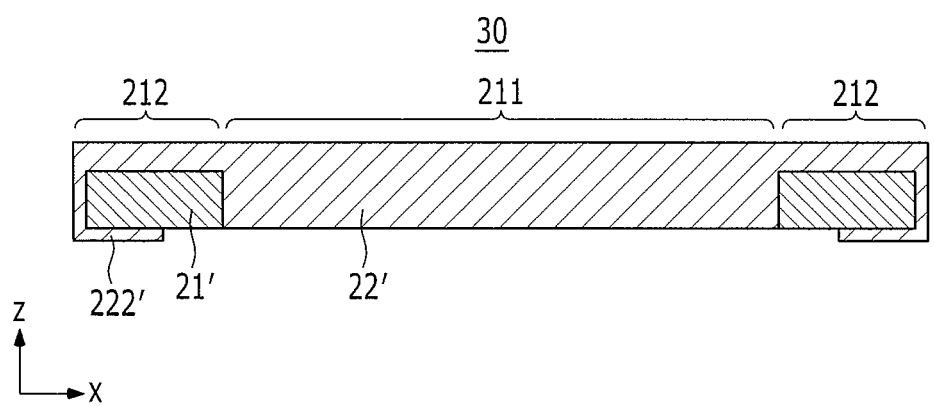
FIG. 5 is a cross-sectional view of a cover window of a display device according to a second exemplary embodiment.

FIG. 5 is a cross-sectional view of a cover window 30 of a display device according to a second exemplary embodiment.

In the present exemplary embodiment, the transparent cover window main body 21' includes a masking layer 213, and instead of forming the non-transparent area 212, the cover window main body 21' is formed with a portion corresponding to the non-transparent area 212, and the transparent area 211 is integrally formed with the same material as the transparent protection layer 22'. This transparent protection layer 22' extends from the front surface to the side surface of the cover window main body 21' and is formed to at least a portion of the side surface and the rear surface. Particularly, the extension 222' may be formed at the region corresponding to the non-transparent area 212 of the rear surface.

Figure 6:
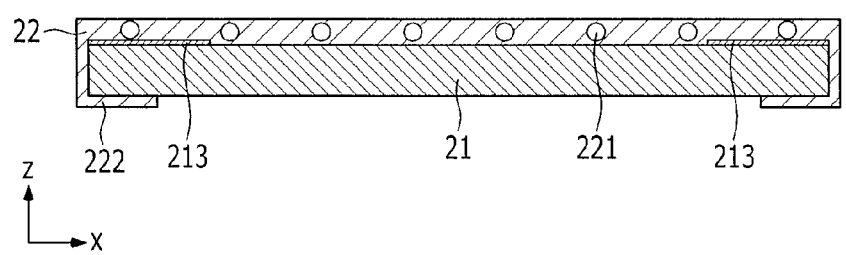
FIG. 6 is a cross-sectional view of a cover window of a display device according to the third exemplary embodiment.

FIG. 6 is a cross-sectional view of a cover window 40 of a display device according to a third exemplary embodiment.

In the present exemplary embodiment, transparent particles 221 having a predetermined diameter are mixed into the resin forming the transparent protection layer 22. The average particle diameter of the transparent particles 221 may be the same as the thickness of the transparent protection layer 22. As an example, the thickness of the transparent protection layer 22 and the average particle diameter of the transparent particles 221 may be in the range of 1-100 μm. Also, the transparent particles 221 may have the same refractive index as the resin forming the transparent protection layer 22. When the refractive index thereof is different from that of the resin, total reflection is generated in the interface between the transparent particles 221 and the resin such that the transparent particles 221 appear as bubbles, and thereby the quality of the display is deteriorated.

As the transparent particles 221, particles made of a resin forming the transparent protection layer 22 (that is, an ultraviolet (UV) radiation and/or thermal hardening transparent resin), glass particles, or silica particles may be used.

Figure 7:
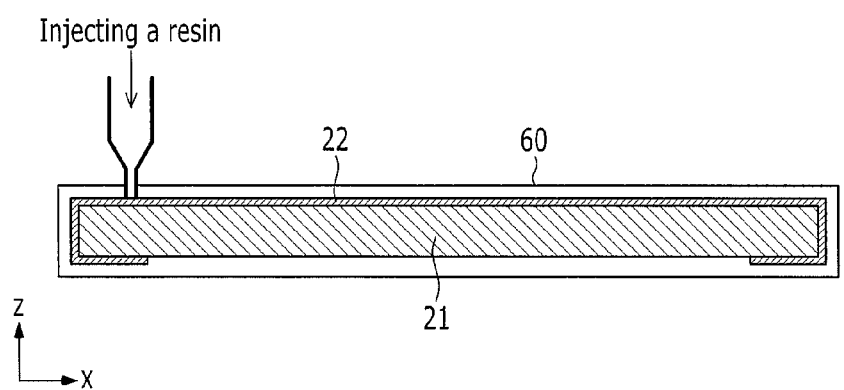
FIG. 7 is a view showing a manufacturing method of a cover window of a display device according to the first exemplary embodiment.

By including the transparent particles 221, when forming the transparent protection layer 22, the transparent particles 221 function as spacers between the cover window main body 21 and a mold 60 (referring to FIG. 7), thereby maintaining a uniform interval between the cover window main body 21 and the mold 60 (referring to FIG. 7). Accordingly, the ultraviolet (UV) radiation and/or thermal hardening transparent resin including the transparent particles 221 may be injected within a range of thickness of the transparent protection layer 22, and if an excess amount of resin is injected, there is an advantage that a subsequent process to remove the excess is unnecessary.

Next, a manufacturing method of a cover window for a display device according to an exemplary embodiment will be described.

Figure 8:
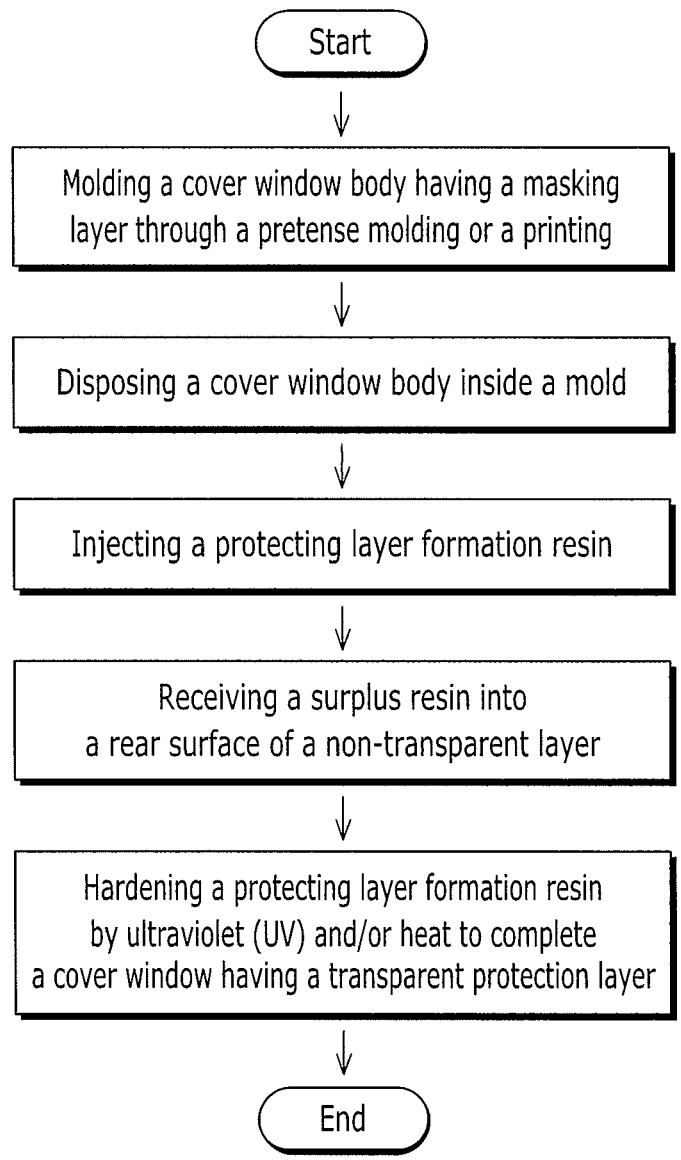
FIG. 8 is a flowchart showing a manufacturing method of a cover window of a display device according to the first exemplary embodiment.

FIG. 7 is a view showing a manufacturing method of a cover window of a display device according to the first exemplary embodiment, and FIG. 8 is a flowchart showing a manufacturing method of a cover window of a display device according to the first exemplary embodiment.

Firstly, a cover window main body 21 is formed. In the present exemplary embodiment, the cover window main body 21 may be formed by forming a masking layer 213 at a portion corresponding to the non-transparent area 212 by a printing method on a transparent plastic material. Also, the masking layer 213 may be formed on the transparent plastic material through a decoration molding method. The cover window main body 21 may be formed with various shapes according to the shape of the display device.

Next, the cover window main body 21 is disposed inside the mold 60. The inner shape of the mold 60 is the same as that of the cover window main body, and the size thereof is larger than the cover window main body 21 by the thickness of the transparent protection layer 22.

Next, an amount of protection layer formation resin is injected between the mold 60 and the cover window main body 21. The amount of the protection layer formation resin is determined according to the thickness of the transparent protection layer 22, and in general, a small amount more than the amount required to form the transparent protection layer 22 is injected. If the resin amount is not sufficient, the transparent protection layer 22 may not be formed on the whole surface of the cover window main body 21 such that the display quality may deteriorate. Here, the surplus resin is moved along the side surface of the cover window main body 21 and received in the portion corresponding to the non-transparent area 212 of the rear surface of the cover window main body 21.

Next, the protection layer formation resin is hardened to form the cover window 20 including the transparent protection layer 22.

According to the manufacturing method of the present invention, a transparent protection layer 22 in which minute cracks are not generated at the surface thereof is formed with a uniform thickness, thereby obtaining a cover window having good resistance against impact from the outside. In the conventional art, the surplus resin is removed through a later process such as cutting after hardening, however minute cracks are generated by the later process such that the overall intensity of the cover window may be deteriorated. However, in the present invention, the surplus resin is received at the rear surface corresponding to the non-transparent area 212 of the cover window main body 21 such that a transparent protection layer 22 of a desired thickness may be obtained without the later process such as cutting.

Also, the cover window main body 21 has a further complicated three-dimensional structure, and since the protection layer formation resin is coated and then hardened to form the cover window 20, a cover window 20 of various shapes may be obtained.

In the manufacturing method, as shown in FIG. 4A and FIG. 4B, the non-transparent area 212 of the cover window main body 21 may be formed to have a hole 214 for installation of a microphone or speaker. In this case, the surplus resin is moved through the hole 214 as well as to the side surface of the cover window main body 21, thereby being received in the rear surface of the non-transparent area 212 near the hole 214.

Also, in the manufacturing method, as shown in FIG. 6, the ultraviolet (UV) and/or thermal hardening resin may be mixed with transparent particles 221. Because of the transparent particles 221, the interval between the mold 60 and the cover window main body 21 may be uniformly maintained such that the transparent protection layer 22 may be further uniform.

Next, a manufacturing method of a cover window according to the second exemplary embodiment will be described with reference to FIG. 5 and FIG. 9. In the present description, only differences from the manufacturing method of the cover window according to the first exemplary embodiment will be explained.

Figure 9:
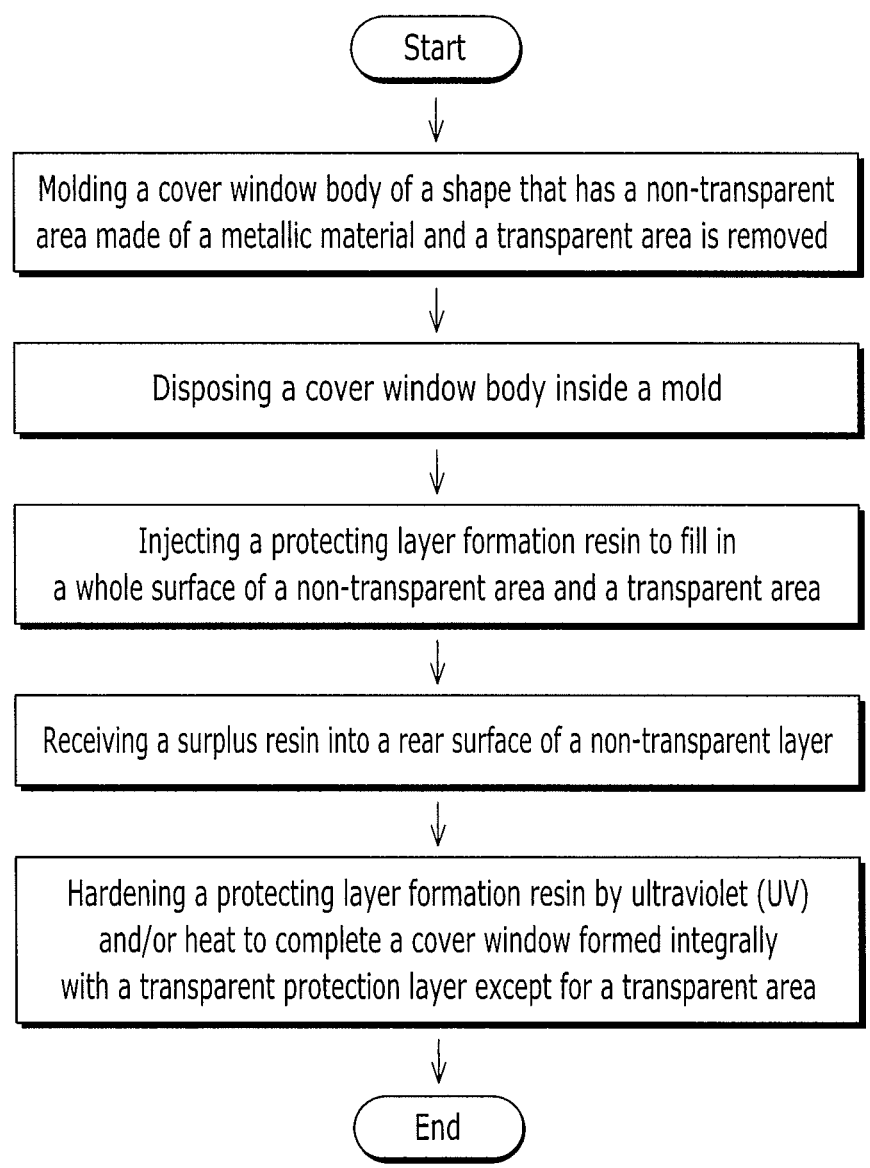
FIG. 9 is a flowchart showing a manufacturing method of a cover window of a display device according to the second exemplary embodiment.

FIG. 9 is a flowchart showing a manufacturing method of a cover window of a display device according to the second exemplary embodiment.

In the present exemplary embodiment, differently from the first exemplary embodiment of the manufacturing method, a cover window main body 21' (referring to FIG. 5) has only the non-transparent area 212. That is, the cover window main body 21' has a shape in which the transparent area in the first exemplary embodiment is removed, for example, the cover window main body 21' having a square frame shape, is formed in the mold 60. The cover window main body 21' may be made of a non-transparent metallic material, a synthetic resin, or glass.

Next, the protection layer formation resin is injected to fill the region corresponding to the transparent area 211. Also, the protection layer formation resin is injected into the front surface of the non-transparent area 212. Next, the surplus resin is received at the rear surface of the non-transparent area 212, and the resin is hardened by ultraviolet (UV) radiation and/or heat to form the cover window 30 having the transparent area 211, the non-transparent area 212, and the transparent protection layer 22.

The present exemplary embodiment uses the same manufacturing method according to the first exemplary embodiment except that the transparent area 211 of the cover window 30 is simultaneously formed using the same material as the transparent protection layer 22'.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising:
a display panel including a display area and a non-display area; and
a cover window positioned at a front side of the display panel and including a transparent area corresponding to the display area and a non-transparent area corresponding to the non-display area,
wherein the cover window includes:
a cover window main body comprising the transparent area and the non-transparent area, and
a transparent protection layer at a front surface of the cover window main body and extending to and covering a portion of the rear surface of the cover window main body, the portion of the rear surface of the cover window main body that is covered by the transparent protection layer corresponding to at least a portion of the non-transparent area of the cover window main body.

2. The display device of claim 1, wherein the transparent protection layer comprises an ultraviolet (UV) and/or thermal hardening resin.

3. The display device of claim 2, wherein the transparent protection layer further includes transparent particles.

4. The display device of claim 3, wherein the transparent particles have a refractive index substantially equivalent to a refractive index of the ultraviolet (UV) and/or thermal hardening resin.

5. The display device of claim 1, further comprising a touch panel between the display panel and the cover window.

6. The display device of claim 1, wherein the cover window main body further includes a masking layer corresponding to the non-transparent area between the cover window main body and the transparent protection layer.

7. The display device of claim 1, wherein the cover window main body includes a hole, and the non-transparent area is formed near the hole.

8. The display device of claim 1, wherein the transparent area of the cover window main body is made of the same material as the transparent protection layer.

9. A method for manufacturing a display device comprising:
providing a display panel including a display area and a non-display area;
providing a cover window main body having a non-transparent area corresponding to the non-display area;
disposing the cover window main body inside a mold;
injecting a protection layer formation resin between the mold and the cover window main body to form a transparent protection layer;
receiving surplus protection layer formation resin that remains after the formation of the transparent protection layer at a rear surface of the cover window main body corresponding to the non-transparent area; and hardening the protection layer formation resin by ultraviolet (UV) radiation and/or heat such that the transparent protection layer is at a front surface of the cover window main body and extends to and covers a portion of the rear surface of the cover window main body.

10. The method of claim 9, wherein the providing the cover window main body further comprises forming a hole at the non-transparent area of the cover window main body.

11. The method of claim 9, wherein the protection layer formation resin includes transparent particles.

12. The method of claim 9, wherein the cover window main body includes a transparent area corresponding to the display area.

13. The method of claim 12, wherein the providing the cover window main body further includes printing a masking layer corresponding to the non-transparent area of the cover window main body.

14. The method of claim 12, wherein the providing the cover window main body further includes decoration-molding a masking layer corresponding to the non-transparent area of the cover window main body.

15. The method of claim 9, wherein the non-transparent area is formed with a frame shape in the cover window main body, and the protection layer formation resin is injected inside the non-transparent area of the frame shape to form the transparent area corresponding to the display area.

16. The method of claim 9, further comprising providing a touch panel between the display panel and the cover window.

* * * * *